United States Patent
Blagodurov et al.

(10) Patent No.: US 9,916,265 B2
(45) Date of Patent: Mar. 13, 2018

(54) TRAFFIC RATE CONTROL FOR INTER-CLASS DATA MIGRATION IN A MULTICLASS MEMORY SYSTEM

(71) Applicant: Advanced Micro Devices, Inc., Sunnyvale, CA (US)

(72) Inventors: Sergey Blagodurov, Bellevue, WA (US); Gabriel H. Loh, Bellevue, WA (US); Yasuko Eckert, Kirkland, WA (US)

(73) Assignee: Advanced Micro Device, Inc., Santa Clara, CA (US)

( * ) Notice: Subject to any disclaimer, the term of this patent is extended or adjusted under 35 U.S.C. 154(b) by 200 days.

(21) Appl. No.: 14/569,825

(22) Filed: Dec. 15, 2014

(65) Prior Publication Data

US 2016/0170919 A1    Jun. 16, 2016

(51) Int. Cl.
   *G06F 3/00*     (2006.01)
   *G06F 13/16*    (2006.01)
   *G06F 12/02*    (2006.01)
   *G06F 11/34*    (2006.01)

(52) U.S. Cl.
   CPC ...... *G06F 13/1694* (2013.01); *G06F 11/3414* (2013.01); *G06F 12/023* (2013.01); *G06F 13/161* (2013.01); *G06F 2212/1044* (2013.01); *Y02B 60/1228* (2013.01)

(58) Field of Classification Search
   CPC .. G06F 13/1694; G06F 12/023; G06F 13/161; G06F 11/3414; G06F 2212/1044
   See application file for complete search history.

(56) References Cited

U.S. PATENT DOCUMENTS

| | | | | |
|---|---|---|---|---|
| 3,685,020 A * | 8/1972 | Meade | ............ | G11C 15/04 365/230.01 |
| 3,855,456 A * | 12/1974 | Summers | ............ | G05B 23/0264 340/503 |
| 5,453,560 A * | 9/1995 | Kulprathipanja | ............ | C07C 7/13 585/828 |
| 7,899,770 B2 * | 3/2011 | Thie | ............ | G06Q 10/00 706/45 |
| 8,095,929 B1 * | 1/2012 | Ji | ............ | G06F 9/4856 709/223 |
| 8,327,103 B1 * | 12/2012 | Can | ............ | G06F 3/061 710/39 |
| 2008/0016058 A1 * | 1/2008 | Murphy | ............ | G06Q 10/06 |

(Continued)

OTHER PUBLICATIONS

"Traffic-Aware Energy Efficient Routing (TEER) Using Multi-Criteria Decision Making for Wireless Sensor Network" by Young Ho Suh, Kyung Tae Kim, Dong Ryeol Shin, Hee Yong Youn; © 2015 IEEE.*

(Continued)

*Primary Examiner* — Jing-Yih Shyu

(57) ABSTRACT

A system includes a plurality of memory classes and a set of one or more processing units coupled to the plurality of memory classes. The system further includes a data migration controller to select a traffic rate as a maximum traffic rate for transferring data between the plurality of memory classes based on a net benefit metric associated with the traffic rate, and to enforce the maximum traffic rate for transferring data between the plurality of memory classes.

17 Claims, 5 Drawing Sheets

(56) References Cited

U.S. PATENT DOCUMENTS

| | | | | |
|---|---|---|---|---|
| 2009/0070721 | A1* | 3/2009 | Solomon | G06F 17/5045 |
| | | | | 716/118 |
| 2013/0007761 | A1* | 1/2013 | O'Sullivan | G06Q 10/00 |
| | | | | 718/104 |
| 2013/0305093 | A1* | 11/2013 | Jayachandran | G06F 11/0754 |
| | | | | 714/37 |
| 2014/0108828 | A1* | 4/2014 | Breternitz | G06F 1/329 |
| | | | | 713/300 |
| 2014/0282503 | A1* | 9/2014 | Gmach | H04L 41/0823 |
| | | | | 718/1 |
| 2015/0332145 | A1* | 11/2015 | Vasseur | G06N 5/04 |
| | | | | 706/12 |

OTHER PUBLICATIONS

"An Improved TOPSIS Vertical Handoff Algorithm for Heterogeneous Wireless Networks", by Liu Sheng-Mei, Pan Su, Xu Minghai; © 2010 IEEE.*

Fred S. Azar, "Multiattribute Decision-Making: Use of Three Scoring Methods to Compare the Performance of Imaging Techniques for Breast Cancer Detection", Technical Reports (CIS), Paper 119, Jan. 1, 2000, 26 pages.

J.R. San Cristobal Mateo, "Multi-Criteria Analysis in the Renewable Energy Industry", Green Energy and Technology, Chapter 4, Copyright 2012, 4 pages.

* cited by examiner

TRAFFIC RATE CONTROL FOR INTER-CLASS DATA MIGRATION IN A MULTICLASS MEMORY SYSTEM

BACKGROUND

Field of the Disclosure

The present disclosure relates generally to memory systems having multiple types of memory or multiple levels of memory.

Description of the Related Art

To meet the memory demands of Exascale and other large-scale workloads, computing systems increasingly are incorporating multiple levels of memory, as well as multiple types of memory. Such systems experience high rates of data traffic across layers or types as executing applications seek to transfer data into and out of the faster, but smaller, memory so as to take advantage of the lower access latencies. However, these data transfers come at a cost, and thus while frequent data transfers may achieve a given performance objective, other objectives may be detrimentally impacted by a high rate of data transfers between memories.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Disclosed herein are example techniques for multiple-objective inter-class traffic rate control in a multiclass memory system. In some embodiments, a computing system comprises the multiclass memory system and a processing system having a plurality of processing units (e.g., processing cores) and a memory management unit (MMU). The multiclass memory system comprises a plurality of memories of at least two different memory classes (each class defining one or both of a memory level and a memory type). Some memory classes provide increased storage capacity, whereas other memory classes provide improved access latency. Software applications executed by the processing system may dynamically migrate blocks of data between different memory classes at run time to match the application's behavior with the best memory class for the task being performed. However, while these inter-class data transfers can improve application performance, they also may detrimentally impact the processing system in other ways. For example, such data transfers inevitably consume power, which in turn may increase the temperature of the processing system. This increase in temperature may be addressed through the use of increased cooling, which itself consumes more power. Moreover, some types of memory may become unreliable after a certain number of write operations to a given storage location (a phenomenon often referred to as "write endurance limit"), and thus more frequent inter-class data transfers may cause the system to more quickly reach the write endurance limit of a memory exhibiting such an effect. Thus, in some embodiments, the processing system employs an inter-class data migration controller to dynamically control the rate of inter-class data transfers (referred to herein as the "traffic rate") for one or more applications in a manner that considers objectives in addition to performance objectives. Such other objectives can include power or energy objectives, write endurance objectives, and the like. Under this approach, the inter-class data migration controller can enforce a maximum traffic rate for the inter-class data transfers that achieves a suitable balance between application/system performance and the detrimental effects of inter-class data transfers on other objectives.

Figure 1:
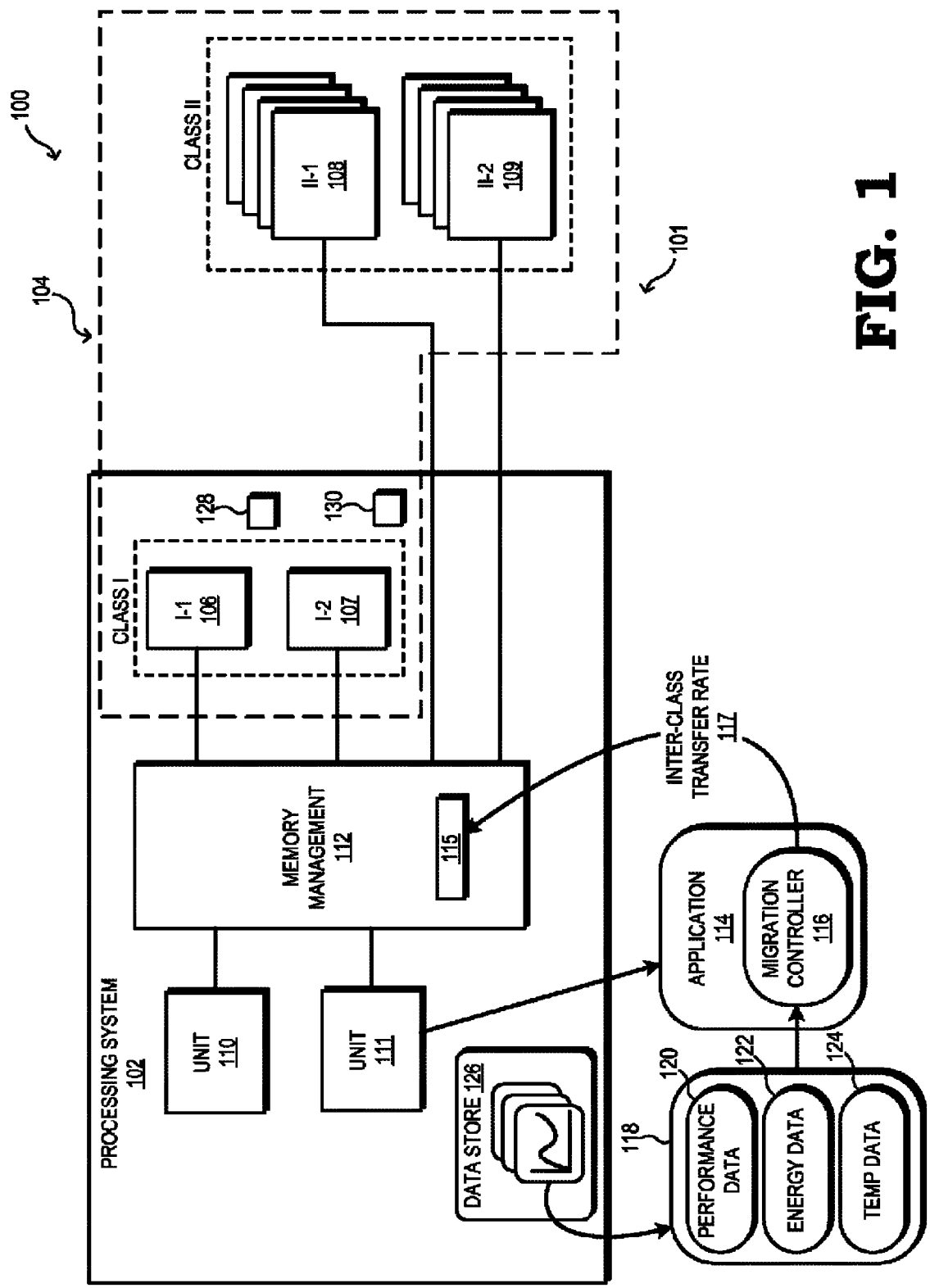
FIG. 1 is a block diagram illustrating a processing system employing a multiclass memory system having multiple-objective traffic rate control in accordance with some embodiments.

FIG. 1 illustrates a block diagram of a computing system 100 utilizing multiple-objective traffic rate control for inter-class data transfers in accordance with some embodiments. The computing system 100 comprises a multiclass memory system 101 and a processing system 102. The multiclass memory system 101 comprises a memory hierarchy 104 comprising a plurality of memories belonging to two or more different classes, each class defining one or both of a level and a type. The memory level is based on the locational access speed of the memory. For example, between in-package memory and outside-package memory (or "on-chip" and "off-chip" memories), the access speed of the in-package memory will generally be faster. In at least one embodiment, the multiclass memory system 101 is a multilevel memory system. The memory type is based on the particular architecture of the memory, and each memory may comprise any of a variety of memory types, for example, lower granularity divisions, such as volatile memory versus non-volatile memory, or dynamic random access memory (DRAM) versus static random access memory (SRAM) versus phase change memory versus memristor memory, or higher granularity divisions, such as different architectures within the same type of general memory architecture, such as double data rate type three synchronous dynamic random access memory (DDR3 SDRAM), graphics double data rate version five synchronous dynamic random access memory (GDDR5 SDRAM), and low power double data rate synchronous dynamic random access memory (LPDDR SDRAM).

Each of the memories 106, 107, 108, 109 is classified into its respective memory class (denoted class "I" and "II") based on its level, type, or both. As such, in some embodiments the memories 106, 107, 108, 109 may be classified such that memories within the same class share one or more of the same level, the same type, and other operational characteristics, such as access time, bandwidth, data transfer rate, and the like. To illustrate, the memories 106, 107 may be classified as class I as they both are at the same level (e.g., in-package) and the memories 108, 109 may be classified as class II as they both are at the same level (e.g., outside-package), or the memories 106, 107 may be classified as class I as they both implement, for example, DRAM architectures whereas the memories 108, 109 may be classified as class II as they both implement, for example, phase-change RAM (PCRAM), memristor, or SRAM architectures, and the like.

Although only two classes are depicted in the example of FIG. 1, in other embodiments the memory hierarchy 104 may be classified based on three or more memory classes. Further, while the memory hierarchy 104 is illustrated in the embodiment of FIG. 1 as two in-package memories 106, 107 and two outside-package memories 108, 109, other embodiments may employ any number of memories spanning at least two classes. Additionally, in some embodiments the memory hierarchy 104 may comprise any combination of in-package and outside-package memories, including all outside-package memory or all in-package memories. Some embodiments of the memory hierarchy 104 may implement die-stacked memory to increase capacity or otherwise take advantage of multiple memories while maintaining a smaller overall footprint. Die-stacked memory may be implemented in a vertical stacking arrangement, using through-silicon via (TSV) or other vertical interconnect technologies, or in a horizontal arrangement, whereby the memory dies are "stacked" horizontally relative to the processor or one another, such that they are connected via an interposer. In the embodiment of FIG. 1, the in-package memories 106, 107 are illustrated as being of the same class (denoted class "I"), and the outside-package memories 108, 109 are illustrated as being of the same class (denoted class "II"). Further, the multiclass memory system 101 of other embodiments may comprise memories of different levels, different types, or a combination thereof. For example, in at least one embodiment, the multiclass memory system 101 comprises memories all of the same level but of different types.

The processing system 102 comprises a plurality of processing units, such as processing units 110, 111, and a memory management unit (MMU) 112. The processing system 102 may comprise a single processor, and the processing units 110, 111 may each comprise a corresponding processor core of the processor. Alternatively, the processing system 102 may comprise multiple processors, in which case the processing units 110, 111 each may comprise a corresponding processor, and each processor may implement one or more processor cores. While the illustrated embodiment depicts an MMU 112 implemented at the processing system 102, in other embodiments the MMU 112 may be implemented elsewhere, for example, at a memory interface of a stacked memory device implementing one or more of the memories 108, 109. Further, in some embodiments, the processing system 102 comprises more than one MMU 112.

The processing units 110, 111 operate to execute one or more software applications, such as application 114, that utilize data stored within the memory hierarchy 104. Note that the term "software application," as used herein, may refer to a standalone executable program, to a group of inter-related executable program, or a group of one or more interrelated sub-processes of a larger executable program (e.g., sub-processes of an operating system kernel). In the process of utilizing data, the MMU 112 retrieves data from the memories 106, 107, 108, 109 in response to a memory address request based on an address space allocation. Thus, in the illustrated embodiment, the MMU 112, and the computing system 100, treats the memories 106, 107, 108, 109 as a single, flat, unified memory address space. As a result, the different classes (I, II) of memories are still logically part of the same level of the traditional memory hierarchy, in that they are all part of the same main or system memory, and are therefore all accessible through the same, unified, flat physical memory address space. In other embodiments, however, the memories 106, 107, 108, and 109 may be allocated among different memory address spaces. Further, in some embodiments, one or more of the memories may be implemented as transparent caches, and thus not allocated or associated with a particular address space.

The different memory classes provide different advantages with respect to the workload represented by an executing software application. On-chip memory classes or other memory classes, such as memory class I having the illustrated memories 106, 107, may provide shorter access latencies (and thus are referred to as "faster memory") but with a smaller storage capacity, and thus may be operated as caches for the processing units 110, 111. In contrast, off-chip memory classes or other memory classes, such as memory class II having the illustrated memories 108, 109, may have longer access latencies (and thus are referred to as "slower memory") but with larger storage capacity, and thus may be operated as main memory for the processing units 110, 111. As such, the MMU 112, in cooperation with the executing application 114, may seek to increase the workload performance of the application 114 by attempting to migrate frequently accessed data to the faster memory regions for the multiclass memory system 101. However, because the size of these faster memory regions is limited, some data may need to be evicted back to the slower memory regions to free up space for the newly requested data. This extensive inter-class data traffic requires energy expenditures and may increase the temperature of the computing system 100. Moreover, the frequent writes resulting from these transfers may tax the write endurance of certain types of memory in the memory hierarchy 104. As such, the performance achieved by the inter-class data migration afforded by given rate of inter-class data transfers may not justify the detrimental impact to the system that may result.

Accordingly, in at least one embodiment, the computing system 100 employs an inter-class data migration controller 116 that enforces a limit on the rate of inter-class data transfers (referred to as the "maximum traffic rate") based on an evaluation of the impact of that traffic rate on multiple objectives, including non-performance objectives such as power/energy consumption, temperature impact, write endurance impact, and the like. In the example depicted in FIG. 1, the data migration controller 116 is implemented as a component of the executing software application 114. That is, the software application 114 employs a module that manages the migration of data among the memory hierarchy 104 on behalf of the software application 114. In other embodiments, the data migration controller 116 is implemented as a component of an operating system (OS) or hypervisor employed by the computing system 100. In such instances, the data migration controller 116 may manage data migration for the application 114, either in a manner transparent to the software application 114, or in a manner in the software application 114 is aware of the allocation of the application's data among the memory classes. Further, an implementation of the data migration controller 116 as part of an OS or hypervisor may allow the data migration controller 116 to manage the data migration for multiple workloads, thereby allowing a beneficial balance between performance and negative impacts to be achieved for the computing system 100 as a whole. In yet other embodiments, the data migration controller 116 may be implemented as hardcoded logic of the processing system 102, such as logic implemented as part of the MMU 112, and which may manage inter-class data migration without consuming processing bandwidth of the processing units 110, 111 of the processing system 102.

As described in greater detail herein, the data migration controller 116 determines a maximum traffic rate 117 that provides a suitable balance between the performance gains provided by inter-class data transfers and the negative impacts of inter-class data transfers and enforces this determined traffic rate so that the inter-class traffic does not exceed this traffic rate. The maximum traffic rate 117 may be expressed and enforced as an amount of data per unit time (e.g., gigabytes/second or terabytes/second), as a number of data transfer transactions on a bus or a collection of busses per unit time, or a combination thereof. In some embodiments, inter-class data migration is managed at a hardware level and the maximum traffic rate 117 thus may be enforced directly by the MMU 112, which may operate to prevent or delay bus transactions when the maximum traffic rate 117 has been reached, or selectively delay bus transactions on an ongoing basis to maintain the actual traffic rate at or below the maximum traffic rate. In such instances, the data migration controller 116 may set this maximum traffic rate 117 by, for example, writing a corresponding value to a control register 115. In other embodiments, inter-class data migration is managed in the runtime system software, and the data migration controller 116 thus may enforce the maximum traffic rate by calculating the inter-class traffic rate that will result from a planned inter-class data migration and then modifying the data migration plan accordingly so as to avoid exceeding the maximum traffic rate.

In determining which traffic rate to enforce as the maximum traffic rate 117 on a per-application or system-wide basis, the data migration controller 116 determines a net benefit of a candidate traffic rate based on a set 118 of metrics representative of different objectives under consideration. To illustrate, the set 118 can include on the positive attribute side one or more performance metrics gleaned from performance data 120 representative of the behavior of the application 114 for the candidate traffic rate, and on the detrimental attribute side one or more energy consumption metrics gleaned from energy consumption data 122, temperature effect metrics gleaned from temperature data 124, write endurance metrics gleaned from write endurance data (not shown), and the like. The data used by the data migration controller 116 to determine the relevant metrics for the various objectives is stored as one or more tables, charts, or other data structures in a data store 126, which may be implemented at the processor system 102 as, for example, volatile or non-volatile RAM.

The net benefit metric represents the positive benefits of the performance gains afforded by data migration subject to the candidate traffic rate as well as the negative impacts of the energy/power consumption, temperature increase, write fatigue, or combinations thereof, resulting from inter-class data transfers at the candidate traffic rate. As described in greater detail below with reference to FIG. 2, in one approach a threshold representing a minimum acceptable net benefit is specified, and the candidate traffic rate may be selected as the maximum traffic rate to be enforced if the net benefit metric meets this threshold. Alternatively, the net benefit metric may be determined for each of a set of candidate traffic rates, and the candidate traffic rate with the highest, or best, net benefit metric may be selected as the maximum traffic rate to be enforced.

The data used as the basis of at least some of the metrics considered by the data migration controller 116 may be determined during run time, from profiling of the system prior to run-time execution (that is, "offline"), from theoretical modeling of the system during development or testing of the software application 114, or a combination thereof. To illustrate, the energy expended by the system to transfer data at a specified transfer rate or the temperature response of the computing system at a specified transfer rate may be determined through experimentation or modeling during design or manufacture of the computing system 100. The modeling or other approximation may reflect the energy consumption or temperature response on the basis of one or more of the number of bits transferred at a given transfer rate, a source-to-destination distance, and the like. To illustrate, offline profiling of the computing system 100 may result in energy consumption data 122 being stored and which represents the energy consumption metrics as, for example, a tuple of transfer rate X corresponding to an energy consumption rate Y, and so forth.

Alternatively, the computing system 100 may employ one or more sensors or other mechanisms to permit on-the-fly measurements of certain data relevant to these metrics. To illustrate, the energy expenditures, power expenditures, and thermal responses of different transfer rates can be measured by the data migration controller 116 from sensors implemented in accordance with, for example, an Intelligent Platform Management Interface (IPMI) specification or an Integrated Lights Out 3 (iLO3) specification. For example, the processing system 100 may employ temperature sensors 128 proximate to one or more of the memories or one or more of the inter-memory busses, and from the change in temperatures reflected in the signaling from the temperature sensors 128 determine a temperature response metric of the computing system 100 for a given transfer rate. Similarly, energy expenditure for a given transfer rate may be measured directly from, for example, a sensor 130 that measures the power expended on one or more inter-class busses at a given rate, or, as noted above, the energy expended for any given transfer rate may be interpolated from one or more measurements of energy expenditure at other transfer rates, or from an experimental or theoretical modeling of the computing system 100.

The one or more performance metrics employed by the data migration controller 116 to determine a net benefit metric likewise may be determined through prior profiling or from run-time or on-the-fly measurement. In some embodiments, the "shape" or "curve" of the relationship between the performance metrics and corresponding traffic rates (and corresponding application phases) may be distilled into one or more data structures that associate a given traffic rate with a corresponding performance metric, and in some instances, an application phase as described below. In other embodiments, this "shape" or "curve" may be represented functionally, such as via a step function or piece-wise function that the data migration controller 116 may use to calculate the performance metric for a given input traffic rate. Regardless of the particular performance metric selected for use, it will likely be workload specific, as the performance of the software application 114 typically is dependent not only on the rate of inter-class traffic, but also on how well the software application reuses data migrated to the faster memory classes. For example, a multimedia streaming application typically accesses each portion of its input only once, and thus there is relatively little performance benefit to having its data migrated to faster memory. Conversely, an analytics application that exhibits locality of memory access typically greatly benefits from having its frequently reused data in faster memory. Thus, while both applications may benefit from inter-class data transfers, the performance of the streaming application is less dependent on the rate of inter-class data traffic than the analytic application.

The dependency of an application's performance on the inter-class traffic rate may be determined based on how well the application reuses its data. This characterization may be based on an access trace that monitors the number of times a particular page or region of memory has been accessed by the software application. To illustrate, a bit field may be used to identify those pages accessed at least H times (that is, "hot" pages), where H is a parameter configurable by an OS or other software. A relatively large number of 'hot" pages signals that the application has frequently reused data, and thus sensitive to a reduced traffic rate, whereas an application with a relatively low number of "hot" pages does not frequently reuse data and thus may be less sensitive to a reduced traffic rate. Such information may be used to inform the performance profiling of the software application in the course of generating performance data and the performance metrics determined therefrom.

The data incorporated into the performance metrics may be generated by the data migration controller 116 through separate bus monitoring, or the data migration controller 116 may leverage existing performance tracking mechanisms of the processing system 100 to evaluate workload performance at a specified traffic rate. To illustrate, the architecture specification for AMD's AMD Family 16h Models 30h-3Fh provides a number of model specific registers (MSRs) that store performance-related information and which may be accessed by the data migration controller 116 to determine a workload performance at a given traffic rate. For example, the MSR NBPMCx1E2 ("CPU Read Command Latency to Target Node 0-3") counts the number of northbridge (NB) clocks from when a targeted command is received in the NB to when the targeted command completes and the NBPMCx 1E3 ("CPU Read Command Requests to Target Node 0-3") counts the number of requests that a latency measurement is made for using NBPMCx1E2. Thus, the data migration controller 116 can divide the total access latency value represented by NBPMCx1E2 by the number of transfer commands represented by NBPMCx1E3 to arrive at an average latency for that type of transfer command.

Figure 2:
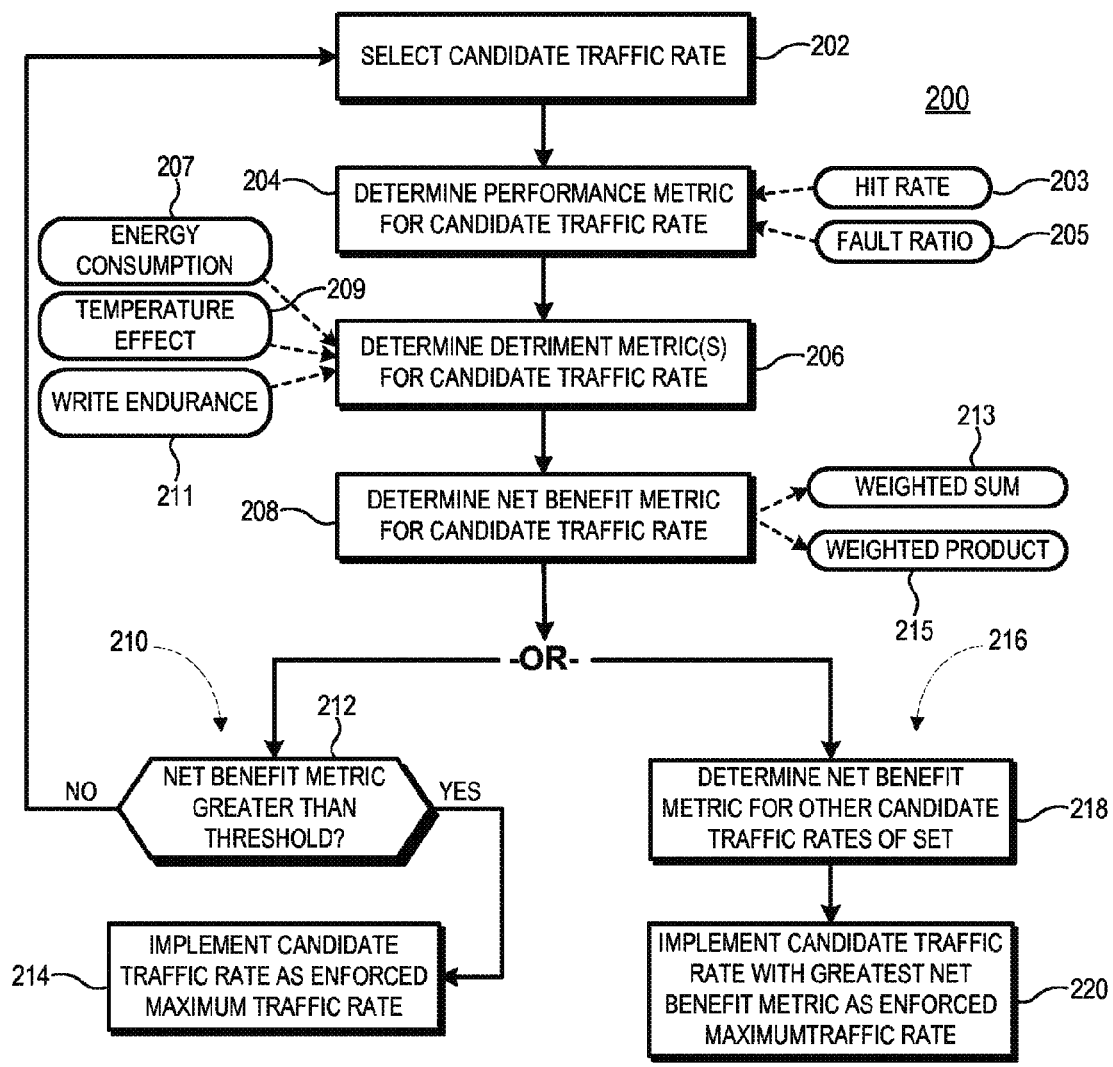
FIG. 2 is a flow diagram illustrating a method for multiple-objective traffic rate control in accordance with some embodiments.

FIG. 2 illustrates an example method 200 for multiple-objective inter-class transfer rate control employed by the data migration controller 116 of the computing system 100 in accordance with some embodiments. The method 200 initiates at block 202 with the selection of a candidate traffic rate by the data migration controller 116. In a run-time scenario, the computing system 100 already may be enforcing a maximum traffic rate for inter-class data transfers, and the data migration controller 116 may select as an increment or decrement of the currently enforced maximum traffic rate as the candidate traffic rate to determine whether the net benefit of inter-class data transfers can be improved upon. Alternatively, in some embodiments the data migration controller 116 may seek to implement the most suitable, or best, traffic rate for a given mode or context, and thus evaluate a plurality of candidate traffic rates for implementation. In such instances, the data migration controller 116 may select the candidate traffic rate at block 202 based on some predetermined selection order among the multiple candidate traffic rates.

At block 204, the data migration controller 116 determines at least one performance metric representing a performance attribute of the software application 114 assuming inter-class data transfers were permitted at the candidate traffic rate. The performance attribute represented by the performance metric can comprise any of a variety of indicators of workload performance. At a basic level, the more data that is brought into the faster memory regions represented by class I, the better the workload performance of the application 114 due to the reduced access latency afforded by the faster memory. Thus, the performance metric may be one that is representative of access latency. To illustrate, in one embodiment, the performance metric may be a hit rate metric 203 (HIT_RATE) for a given traffic rate X that represents a ratio of the number of successful memory reads or writes performed to the faster memory regions (fast_mem_accesses) to the total number of memory accesses (total_mem_accesses), as illustrated by the following equation:

$$\text{HIT\_RATE}(X) = \frac{\text{fast\_mem\_accesses}}{\text{total\_mem\_accesses}} \qquad \text{EQ. 1}$$

In a context of an AMD architecture, the data migration controller 116 may access the data needed to calculate this metric from the performance counters available in the MSR space, such as the PMCx041 ("Data Cache Misses") register, the PMCx07E ("L2 Cache Misses") register, the PMCx 081 ("Instruction Cache Misses") register, and the like.

Additionally or alternatively, page faults introduce significant memory access latency, and thus the performance metric may reflect a page fault attribute, such as a page fault metric 205 (FAULT_RATIO) for a given traffic rate X that represents a ratio of the number of minor page faults (minor_page_faults) to the total number of page faults (total_page_faults), as illustrated by the following equation:

$$\text{FAULT\_RATIO}(X) = \frac{\text{minor\_page\_faults}}{\text{total\_page\_faults}} \qquad \text{EQ. 2}$$

The data migration controller 116 may obtain the data needed to calculate this metric from, for example, the page-related data structures maintained in the OS kernel. Still further, in some embodiments, a performance metric may be an aggregate function of two or more other performance metrics, such as in the form of a weighted sum, weighted product, or some other combination of the hit rate metric 203 and the page fault metric 205. Although examples of performance metrics are described above, the techniques are not limited to these examples, but instead may implement any of a variety of performance metrics reflective of the performance of a workload under a given inter-class data transfer rate scenario. Example methods for determining the particular performance metric for an application 114 or other workload are described below with reference to FIGS. 4 and 5.

As noted above, the inter-class transfer of data brings with it not only performance gains by having data reside in faster memory, but also detrimentally impacts the computing system 100 through temperature increases, energy expenditures, write fatigue, and the like. Accordingly, at block 206 the data migration controller 116 determines one or more detriment metrics representative of the negative impacts on the computing system 100 of the candidate traffic rate. That is, the data migration controller 116 determines metrics representative of system objectives other than performance, such as reduced power consumption, reduced heat generation (and the consequential reduced need for cooling), reduce write wear, and the like. Examples of such detriment metrics can include an energy consumption metric 207, a temperature effect metric 209, and a write endurance metric 211. The energy consumption metric 207 represents the energy consumption impact on the computing system 100 for inter-class data transfers conducted at the candidate traffic rate. The temperature effect metric 209 represents the temperature response of the computing system 100 when conducting inter-class data transfers at the candidate traffic rate. This may also represent the additional energy needed to cool the computing system 100 in view of the temperature response. The write endurance metric 211 represents some valuation of the impact on the write endurance limit of one or more memories of the multiclass memory system 101 in view of the candidate traffic rate.

Unlike performance-related metrics, many of the detrimental metrics typically are less dependent on the behavior of a particular workload, and more dependent on the rate, frequency, and transmission route of the data traffic. As described above, the detriment metrics for the candidate traffic rate can be determined at run time or through prior characterization or other profiling. For example, for an on-the-fly determination of the energy consumption metric 207, the data migration controller 116 can temporarily switch to enforcing the candidate traffic rate as the maximum traffic rate for a corresponding test period and then use one or more sensors to determine an average energy expenditure by the computing system 100 in conducting inter-class data transfers at the candidate traffic rate during the test period. The data migration controller 116 then may convert this data to a value for the energy consumption metric 207 in accordance with some specified conversion for this information. With respect to temperature response in particular, this effect has both a temporal impact and a spatial impact as heat spreads to nearby components and because it takes time to remove this heat. That is, the impact of a given traffic rate on the temperature of the computing system 100 likely has ramifications for a while after the traffic rate has ceased being enforced. As such, the temperature effect metric 209 may reflect not only the temporal impact of the heat generated by inter-class data transfers at the candidate traffic rate, but the spatial impact due to the spread of the generated heat as well.

Alternatively, one or more of the detrimental metrics may be determined from behavior data generated from prior profiling or from modeling of the computing system 100, and which is then stored in the data store 126 for subsequent access by the data migration controller 116 for determining the corresponding metric. To illustrate, the computing system 100 may be modeled to determine the thermal behavior for each of a plurality of transfer rates, and this information may be distilled into thermal effect metrics 209 for each modeled transfer rate. The thermal effect metric-transfer rate pairs then may be used to generate a chart, list, or other data structure that is stored in the data store 126, and the data migration controller thus may determine the thermal effect metric 209 for the candidate transfer rate by accessing it from the data structure. In still other embodiments, the behavior of the computing system with respect to a detrimental effect may be distilled into a step function, piecewise function, or other function-like representation, which then may be employed by the data migration controller 116 to determine the corresponding detriment metric for the candidate transfer rate.

At block 208, the data migration controller 116 determines a net benefit metric for the candidate transfer rate based on the one or more performance metrics determined at block 204 and the one or more detriment metrics determined at block 206. The particular mechanism for calculating the net benefit metric typically will be context-specific and may depend on the manner in which the metrics are represented. In one embodiment, a weighted sum 213 may be used to calculate the net benefit metric. To illustrate, assuming reduced energy consumption and temperature generation are the two other objectives in addition to performance to be considered, the data migration controller 116 may employ the following equation as the weighted sum 213 used to generate the net benefit metric:

$$\text{NET\_BENEFIT}(X) = W_P \cdot \text{Perf}(X) - W_E \cdot \text{Energy}(X) - W_T \cdot \text{Temp}(X) \qquad \text{EQ. 3}$$

where NET_BENEFIT(X) is the net benefit metric for the candidate traffic rate (X), Perf (X) is the performance metric for the candidate traffic rate, Energy(X) is the energy consumption metric for the candidate traffic rate, and Temp(X) is the temperature effect metric for the candidate traffic rate. It will be appreciated that the performance, temperature effect, and energy consumption metrics typically will be normalized. The weights $W_P$, $W_E$, and $W_T$ are selected for a particular implementation of the computing system 100 based on, for example, administrator preference. The particular values of these weights may be calculated beforehand using, for example, a multiple-objective algorithm that visualizes a Pareto front of equally optimal solutions for a representative problem, such as with a Non-dominating Sorting Genetic Algorithm-II (NGSA-II). Similar weighted sum equations may be developed to incorporate additional or alternative detriment metrics, such as those representing data transfer latency or write endurance impact.

In another embodiment, a weighted product 215 may be used to calculate the net benefit metric. To illustrate, for an example that includes reduced energy consumption and heat generation as the non-performance objectives the data migration controller 116 may employ the following equation as the weighted product 215 used to generate the net benefit metric:

$$\text{NET\_BENEFIT}(X) = \text{Perf}^{W_P}(X) \cdot \text{Energy}^{-W_E}(X) \cdot \text{Temp}^{-W_T}(X) \qquad \text{EQ. 4}$$

where NET_BENEFIT(X) is the net benefit metric for the candidate traffic rate (X), Perf (X) is the performance metric for the candidate traffic rate, Energy(X) is the energy consumption metric for the candidate traffic rate, and Temp(X) is the temperature effect metric for the candidate traffic rate, and $W_P$, $W_E$, and $W_T$ are the corresponding weights as described above. An advantage of using the weighted product 215 is that the different metrics do not need to be normalized.

Method 200 depicts two alternative approaches 210 and 216 to utilizing the net benefit metric determined at block 208 to select a candidate traffic rate for enforcement. In the approach 210, a minimum acceptable benefit is specified, and the data migration controller 116 seeks a traffic rate that satisfies this constraint. Under this approach, the data migration controller 116 compares the net benefit metric to a specified threshold that represents this minimum acceptable benefit at block 212. If the net benefit metric meets this threshold, then at block 214 the data migration controller 116 implements the candidate traffic rate as the enforced maximum traffic rate. However, if the net benefit metric does not meet this threshold, then the method 200 returns to block 202 with a different candidate traffic rate selected and evaluated as described above. Alternatively, if the data migration controller 116 is already enforcing a current maximum traffic rate, the data migration controller 116 may cease searching for an improved benefit scenario and continue to enforce the current maximum traffic rate.

In the approach 216, the data migration controller 116 periodically attempts to find the best maximum traffic rate for the current conditions in the computing system 100. Under this approach, at block 218 the data migration controller 116 repeats the process of blocks 202, 204, 206, and 208 to determine a corresponding net benefit metric for each candidate traffic rate of a set of candidate traffic rates. Then, at block 220, the data migration controller 116 selects the candidate traffic rate with the highest net benefit metric for implementation as the enforced maximum traffic rate for the computing system 100.

Figure 3:
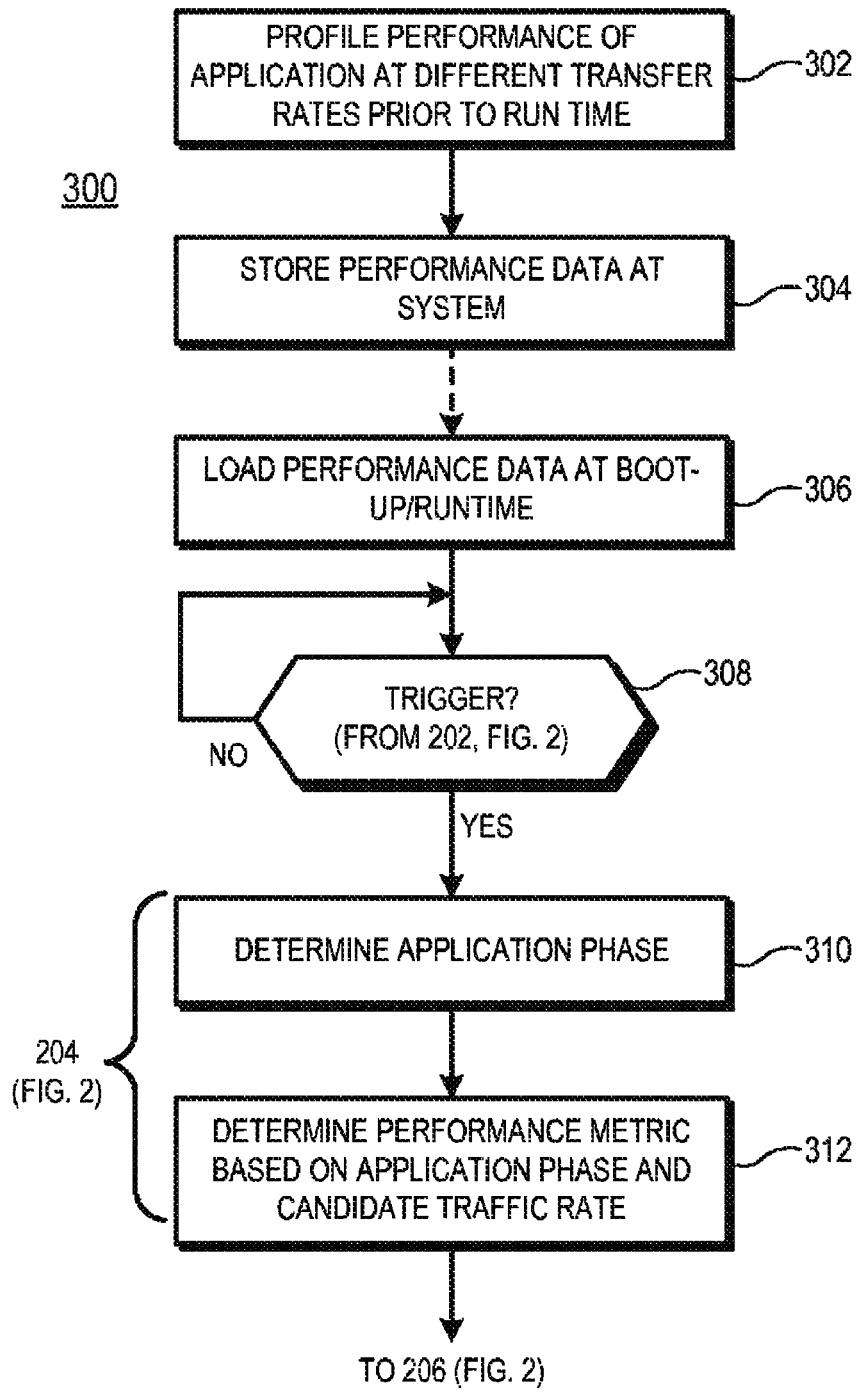
FIG. 3 is a flow diagram illustrating a method for offline performance profiling of a software application at different inter-class traffic rates in accordance with some embodiments.
Figure 4:
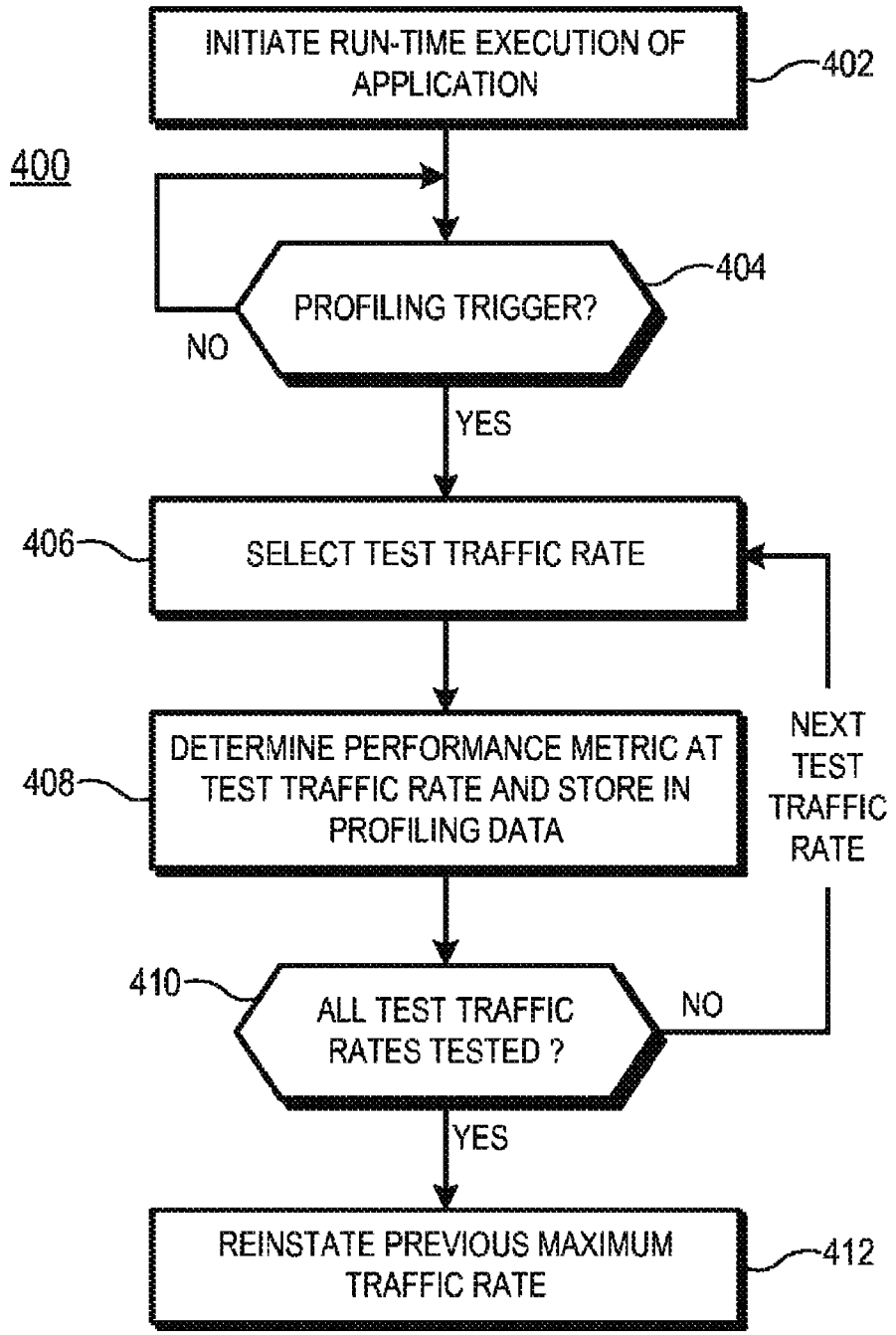
FIG. 4 is a flow diagram illustrating a method for run-time performance profiling of a software application at different inter-class traffic rates in accordance with some embodiments.

FIGS. 3 and 4 illustrate alternative or complementary methods for the selection or other determination of a performance metric for a given candidate traffic rate. The method 300 of FIG. 3 illustrates an approach for determining the performance metric based on pre-execution profiling of the workload or behavior of the software application. The method 400 of FIG. 4 illustrates an approach for determining the performance metric based on performance data gathered during execution of the software application (that is, at run time).

In FIG. 3, the method 300 initiates at block 302 with the profiling of the software application 114 prior to run-time execution of the software application 114. To illustrate, a producer or supplier of the software application 114 may model the behavior of the software application 114 or execute the software application in a test system so as to analyze its performance at different inter-class traffic rates. The resulting performance data then may be supplied with the software application 114 to the end user implementing the software application 114 on a production computing system. As part of the profiling process, the software application 114 is operated at different maximum traffic rates and its corresponding performance behavior is recorded and assessed. Further, it will be appreciated that the software application 114 may have different phases in which it may behave differently for the same given maximum traffic rate. To illustrate, the software application 114 may have both input/output (I/O) phases in which I/O operations are emphasized and calculation phases in which data operations are emphasized, and the I/O phases may exhibit, for example, a lower performance benefit at a certain traffic rate than the calculation phases. As such, the profiling of the software application 114 may also include the identification of these different application phases and the separate performance profiling of each phase for each traffic rate under consideration.

At block 304, the performance data gleaned from the profiling process is stored at the computing system 100. In one embodiment, the performance data is provided with the software application 114 and stored with the software application 114. To illustrate, the developer or supplier of the software application 114 may provide the performance data as embedded within the software application 114 or as a configuration file or other file supplied with the executable representing the software application 114. In other instances where the software application 114 is an OS kernel function or hypervisor function or other system-critical function, the performance data may be stored with the basic input output system (BIOS) or other boot-up configuration data so as to be loaded at system startup. The performance data may be stored as, for example, a list, table, or other data structure that correlates a given application phase and traffic rate with a corresponding performance metric, or with a set of data from which one or more performance metrics may be calculated by the data migration controller 116.

At some subsequent point in time, the stored performance data is loaded into a memory location in preparation for access at block 306. As noted, the performance data may be stored as part of the BIOS or other boot-up configuration data and thus may be loaded at system boot-up. Alternatively, the performance data may be stored in the software application 114 or as a configuration file, and thus may be loaded concurrent with the loading of the software application 114 in anticipation of its execution.

With the performance data loaded, the data migration controller 116 waits for the occurrence of a trigger at block 308. In one embodiment, this trigger can be, for example, the selection of a candidate traffic rate at block 202 for the method 200 of FIG. 2. When the trigger is detected, the data migration controller 116 initiates the determination of the performance metric for a selected candidate traffic rate as described above with respect to block 204 of method 200. As part of this process, at block 310 the data migration controller 116 determines the current application phase of the executing software application 114, or the application phase the executing software application 114 is anticipated to enter shortly. The application phase can be determined through explicit indicia, such as through system calls or other explicit signaling provided by the software application 114, or the data migration controller 116 may monitor the behavior of the software application 114 to implicitly estimate the current or anticipated application phase. At block 312, the data migration controller 116 indexes the loaded performance data based on the application phase and the selected candidate traffic rate to identify the performance metric associated with that particular application phase and traffic rate. To illustrate, the performance data may be stored in a table having entries indexed by application phase and traffic rate, and each entry storing a value representing the corresponding performance metric. Alternatively, each entry could store raw performance data from which the data migration controller 116 may derive one or more performance metrics. With the performance metric so identified, the method 300 ends and the process flow may continue to, for example, block 206 of method 200.

The method 400 of FIG. 4 initiates at block 402 with the initiation of run-time execution of the software application 114. Initially, the data migration controller 116 may set the maximum traffic rate for the software application 114 at a default traffic rate, or may attempt to limit inter-class data migration for the software application 114. Upon initialization, the data migration controller 116 monitors for a profiling trigger 404. The profiling trigger may include, for example, a periodic trigger in the form of an expiring countdown timer, detection of a momentary lull in the bus traffic for the software application 114, detection of an energy consumption condition or temperature condition, detection of a change in application phase, and the like. In response to detecting a profiling trigger, the data migration controller 116 initiates a run-time profiling process. Accordingly, at block 406, the data migration controller 116 selects a test traffic rate. In one embodiment, the test traffic rate is selected from a set of test traffic rates in a specified order. At block 408, the data migration controller 116 temporarily implements the selected test traffic rate as the enforced maximum traffic rate for the software application 114 for a test period and observes the resulting performance behavior (e.g., the resulting hit rate or the resulting page fault ratio) of the software application with the test traffic rate so implemented during the test period. The observed behavior is used to generate performance data or performance metrics for the test traffic rate, and the generated performance information is stored in the corresponding data structure. If it is determined at block 410 that additional test traffic rates remain untested under the current software application conditions, the method returns to block 406 for the selection of the next test traffic rate and the profiling of the software application 114 with this next test traffic rate at block 408. When the data migration controller 116 determines that all of the test traffic rates have been profiled, at block 412 the data migration controller 116 reinstates the maximum traffic rate that was in force at the time that the profiling trigger was detected at block 404.

The performance data or performance metrics determined by the data migration controller 116 in this process may then be stored and loaded for use in determining a performance metric for a candidate traffic rate as described above with reference to block 204 of FIG. 2. In some embodiments, this data is stored on a temporary basis such that the performance data is erased or rendered invalid when execution of the software application 114 is terminated, such that the in-situ performance profiling is performed anew with each execution of the software application 114. In other embodiments, the results of the in-situ performance profiling may be non-volatilely stored such that the same in-situ performance profile results may be used for one or more subsequent execution iterations of the software application 114.

Figures 5, 6:
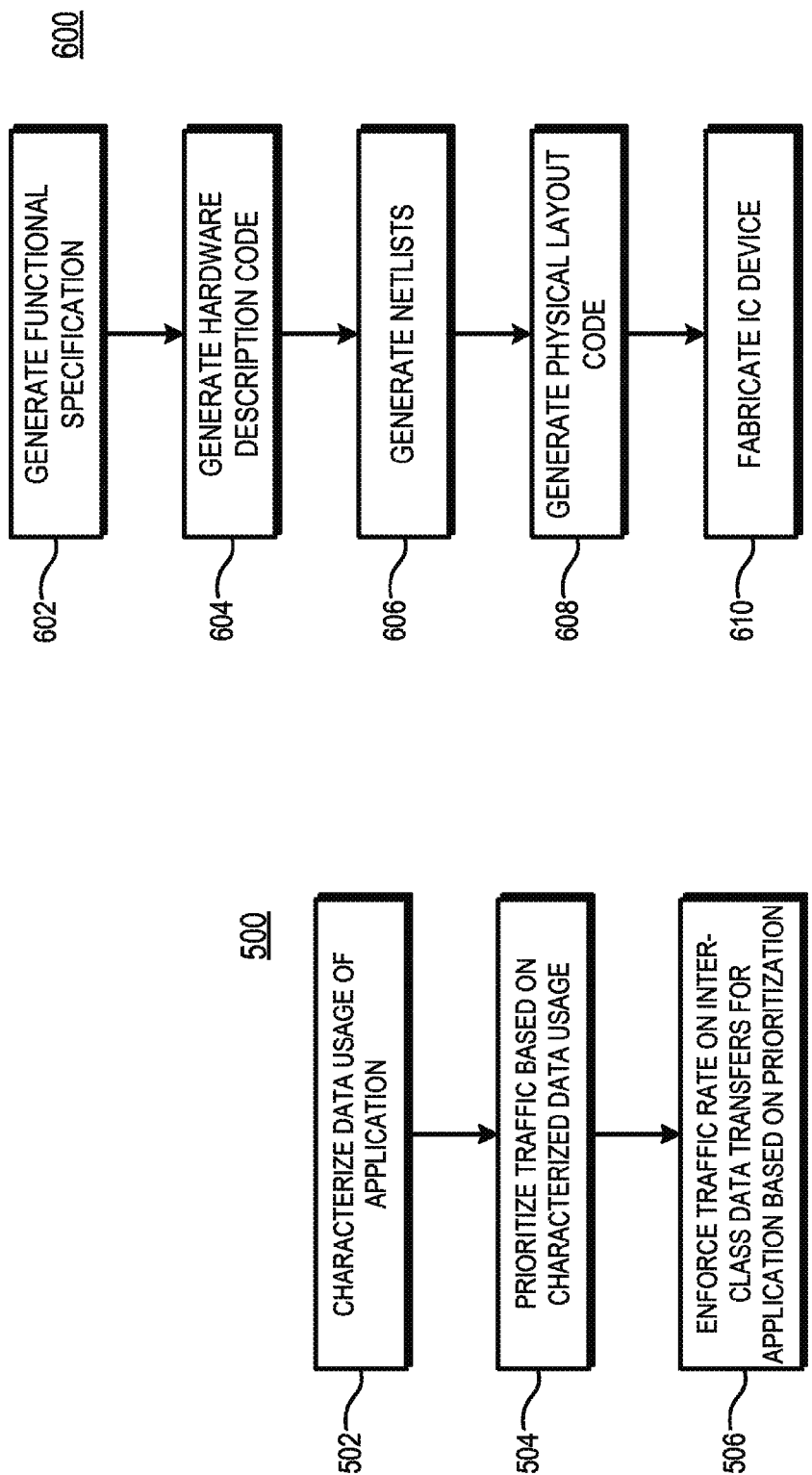
FIG. 5 is a flow diagram illustrating a method for prioritizing inter-class data transfers for an enforced maximum traffic rate in accordance with at least one embodiment of the present disclosure.
FIG. 6 is a flow diagram illustrating a method for designing and fabricating an integrated circuit device implementing at least a portion of a component of a processing system in accordance with some embodiments.

Under the multiple-objective approaches detailed herein, it may be that for the sake of a maximized net benefit, the inter-class traffic rate may need to be reduced in order to reduce the impact of the detrimental effects of the inter-class traffic. However, this does not mean that the software application 114 has to experience a proportional performance degradation. In many instances, some bus transactions in the multiclass memory system 101 may be more important, or may have a larger performance impact if stored in faster memory, than other bus transactions. Accordingly, in some embodiments, the data migration controller 116 may configure the MMU 112 to prioritize certain bus transactions over other bus transactions while continuing to be subject to the enforced maximum traffic rate. FIG. 5 illustrates an example method 500 for providing this prioritization.

Typically, the bus transactions that migrate data into faster memory regions can be divided into two classes: bus transactions that service demand misses; and bus transactions that migrate data preemptively (e.g., prefetching operations). Bus transactions that service a demand miss typically are needed by the software application 114 immediately, and thus there is motivation to prioritize bus transactions that service a demand miss. However, if demand misses are frequent in the faster memory classes, it may be beneficial to reduce the priority of bus transactions that service demand misses in favor of bus transactions that support prefetching activities, which in turn leads to reduced demand misses. Thus, in order to select the appropriate priority, the evaluated application phase may be characterized as demand-miss dominant, in which case prefetch traffic is prioritized, or as prefetch dominant, in which case demand miss traffic is prioritized.

To this end, at block 502 of method 500, the data migration controller 116 monitors bus transactions instigated by the software application 114 to characterize the data usage of the software application 114 in the current application phase. As noted above, this characterization can include characterizing the application phase as demand-miss dominant in response to observing a high ratio of demand miss traffic to overall traffic, or as prefetch dominant in response to observing a high ratio of prefetch traffic to overall traffic. At block 504, the data migration controller 116 configures the MMU 112 to prioritize certain types of bus transactions over others based on the data usage characterization determined at block 502. For a demand-miss dominant application phase, the MMU 112 may prioritize prefetch bus transactions, and conversely may prioritize demand miss buss transactions for a prefetch dominant application phase. At block 506, the MMU 112 and data migration controller 116 enforce the maximum traffic rate based on the prioritization set at block 504.

The prioritization of certain types of bus traffic in view of a maximum traffic rate may be achieved in a number of ways. In one embodiment, the MMU 112 may enforce this priority though strict prioritization—that is, all pending high-priority bus transactions are permitted to complete before any lower-priority bus transactions. Alternatively, the prioritization may be achieved through preferential selection, such as permitting three high-priority bus transactions to complete for every two lower-priority bus transactions permitted to complete, subject to the maximum traffic rate. As yet another example, a fair selection process may be implemented for all types of bus transactions regardless of priority until a certain threshold traffic rate is reached, at which point the high-priority bus transactions are then preferentially selected. To illustrate, if the maximum traffic rate is, for example, 1 gigabyte (GB) of data per second (GB/s), prioritization may be disregarded until the actual traffic rate reaches, for example, 800 megabytes per second (MB/s), at which point the MMU 112 may permit only high-priority bus transactions, or may select a higher ratio of high-priority bus transactions, but only up to the maximum 1 GB/s traffic rate.

In some embodiments, the apparatus and techniques described above are implemented in a system comprising one or more integrated circuit (IC) devices (also referred to as integrated circuit packages or microchips), such as the computing system 100 described above with reference to FIGS. 1-5. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

FIG. 6 is a flow diagram illustrating an example method 600 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB. At block 604, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated. Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 606 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a multiclass memory system, a method comprising:
selecting a traffic rate based on a net benefit metric associated with the traffic rate; and
enforcing the selected traffic rate as a maximum traffic rate for transferring data between classes of the multiclass memory system,
wherein selecting the traffic rate comprises:
for each of a plurality of candidate traffic rates, temporarily implementing the candidate traffic rate for a corresponding test period and monitoring a behavior of the multiclass memory system during the corresponding test period to determine a net benefit metric for the candidate traffic rate; and selecting as the maximum traffic rate that candidate traffic rate having a largest net benefit metric.

2. The method of claim 1, wherein the net benefit metric represents at least one of: at least one performance metric for the selected traffic rate; and at least one detriment metric for the selected traffic rate.

3. The method of claim 2, wherein the at net benefit metric for the candidate traffic rate represents at least one of: a hit rate metric; and a page fault metric.

4. The method of claim 2, wherein the at least one detriment metric represents at least one of: an energy consumption metric for the selected traffic rate; a thermal effect metric for the selected traffic rate; and a write endurance metric for the selected traffic rate.

5. The method of claim 4, wherein the net benefit metric represents an aggregate function of at least one performance metric and the at least one detriment metric.

6. The method of claim 1, wherein selecting the traffic rate comprises:
accessing a data structure to select the traffic rate, the data structure representing a plurality of candidate traffic rates and information associated with a performance metric for each of the candidate traffic rates.

7. The method of claim 6, wherein:
the data structure is associated with a software application;
the information associated with a net benefit metric for each of the candidate traffic rates reflects information associated with a net benefit metric for the software application for each of the candidate traffic rates; and
enforcing the traffic rate as the maximum traffic rate comprises enforcing the maximum traffic rate for transferring data between classes of the multiclass memory system on behalf of the software application.

8. The method of claim 7, wherein:
the data structure is associated with a select phase of a plurality of phases of the application; and
enforcing the maximum traffic rate comprises enforcing the maximum traffic rate for transferring data between classes of the multiclass memory system on behalf of the application while the application is in the select phase.

9. The method of claim 1, further comprising:
identifying a first type of inter-class data transfer as a high priority data transfer; and
identifying a second type of inter-class data transfer as a low priority data transfer;
wherein enforcing the maximum traffic rate comprises prioritizing inter-class data transfers of the first type over inter-class data transfers of the second type while maintaining the maximum traffic rate.

10. A system comprising:
a plurality of memory classes;
a set of one or more processing units coupled to the plurality of memory classes; and
a data migration controller to select a traffic rate based on a net benefit metric associated with the traffic rate, and to enforce the selected traffic rate as a maximum traffic rate for transferring data between the plurality of memory classes,
wherein the data migration controller comprises a component of a software application executed by the set of one or more processing units; and the data migration controller enforces the maximum traffic rate for inter-class transfers of data associated with the software application.

11. The system of claim 10, wherein the net benefit metric represents at least one of: at least one performance metric for the selected traffic rate; and at least one detriment metric for the selected traffic rate.

12. The system of claim 11, wherein the at least one detriment metric represents at least one of: an energy consumption metric for the selected traffic rate; a thermal effect metric for the selected traffic rate; and a write endurance metric for the selected traffic rate.

13. The system of claim 10, wherein the data migration controller is to select the traffic rate by accessing a data structure to select the traffic rate, the data structure representing a plurality of candidate traffic rates and information associated with a performance metric for each of the candidate traffic rates.

14. The system of claim 10, wherein the data migration controller is to select the traffic rate by:
for each of a plurality of candidate traffic rates, temporarily implementing the candidate traffic rate for a corresponding test period and monitoring a behavior of the system during the corresponding test period to determine a net benefit metric for the candidate traffic rate; and
selecting as the maximum traffic rate that candidate traffic rate having a largest net benefit metric.

15. The system of claim 10, wherein the data migration controller further is to:
identify a first type of inter-class data transfer as a high priority data transfer; and
identify a second type of inter-class data transfer as a low priority data transfer;
wherein the data migration controller is to prioritize inter-class data transfers of the first type over inter-class data transfers of the second type while maintaining the maximum traffic rate.

16. A non-transitory computer readable storage medium embodying a set of executable instructions, the set of executable instructions to manipulate one or more processors to:
select a traffic rate based on a net benefit metric associated with the traffic rate;

enforce the selected traffic rate as a maximum traffic rate for transferring data between classes of a multiclass memory system;

identify a first type of inter-class data transfer as a high priority data transfer;

identify a second type of interclass data transfer as a low priority data transfer, and prioritize inter-class data transfers of the first type over inter-class data transfers of the second type while maintaining the maximum traffic rate in order to enforce the selected traffic rate.

17. The computer readable storage medium of claim 16, wherein the net benefit metric represents at least one of: at least one performance metric for the selected traffic rate; and at least one detriment metric for the selected traffic rate.

* * * * *